United States Patent [19]

Lane et al.

[11] Patent Number: 5,691,406
[45] Date of Patent: Nov. 25, 1997

[54] UNIVERSAL EPDM/BUTYL COMPOUND FOR USE AS AN ELASTOMERIC BARRIER IN WATER STORAGE AND TREATMENT SYSTEMS AND THE LIKE

[75] Inventors: Joseph A. Lane, Taunton, Mass.; Julian Mitchel, North Haven, Conn.

[73] Assignee: Amtrol Inc., West Warwick, R.I.

[21] Appl. No.: 701,080

[22] Filed: Aug. 21, 1996

[51] Int. Cl.$^6$ ....................................... C08K 3/18
[52] U.S. Cl. .................... 524/432; 524/322; 524/394; 524/415; 524/419; 524/433; 524/495; 524/496
[58] Field of Search ................... 524/432, 433, 524/322, 394, 419, 415, 495, 496

[56] References Cited

U.S. PATENT DOCUMENTS

| | | | |
|---|---|---|---|
| 3,660,224 | 5/1972 | Cau | 161/252 |
| 3,806,555 | 4/1974 | Kawagoe | 260/878 |
| 3,968,185 | 7/1976 | Baldwin et al. | 260/880 |
| 4,026,966 | 5/1977 | Baldwin et al. | 260/878 |
| 4,599,384 | 7/1986 | Farona et al. | 525/245 |
| 4,754,793 | 7/1988 | Mohammed | 152/510 |
| 4,814,388 | 3/1989 | Nagai et al. | 525/322 |
| 4,851,462 | 7/1989 | Chmiel et al. | 524/296 |
| 4,960,829 | 10/1990 | Allen et al. | 525/193 |
| 4,983,528 | 1/1991 | Loucks | 436/141 |
| 5,276,094 | 1/1994 | Kaszas | 525/95 |
| 5,279,606 | 1/1994 | Haber | 604/403 |

*Primary Examiner*—Edward J. Cain
*Attorney, Agent, or Firm*—Joseph J. Kaliko

[57] ABSTRACT

A universal elastomeric compound whose improved features display excellent permeability while simultaneously having above average chlorine compatibility. This improved elastomeric compound comprises a measured quantity of a terpolymer of ethylene-propylene-non-conjugated diene copolymer (i.e. EPDM, e.g. ROYALENE 3180), chlorinated Isobutylene (e.g. Chlorobutyl 1066), furnace or carbon black (e.g., N-550 Black), paraffinic oil (e.g., Sunpar 150 Oil), organofunctional magnesium silicate (e.g., Mistron CB), magnesium oxide (e.g., Maglite D Bar), zinc oxide, stearic acid, tetramethylthiuram disulfide (e.g., TUEX), zinc thiophosphate (e.g., ROYALAC 136), and treated sulfur (e.g., Spider Sulfur). Adding a specified quantity of said ROYALAC 136, TUEX, and Spider Sulfur to the EPDM/butyl compound imparts low taste and odor to water. Additionally, adding a specified quantity of said Mistron CB to ROYALENE 3180 and Chlorobutyl 1066, provides for an elastomeric compound having excellent resistance to chloramines. Because the herein prescribed combination of EPDM, butyl and other disclosed compositions exhibits low gas permeability, a high degree of chlorine compatibility, imparts low taste and odor to water, exhibits good flex characteristics, in addition to yielding extractants below the requirements of ANSI/NSF Standard 61 Health Effects Standard, the compound can be effectively used as an elastomeric barrier (e.g., a diaphragm structure) in water storage and treatment systems, valves, pumps or the like.

27 Claims, No Drawings

UNIVERSAL EPDM/BUTYL COMPOUND FOR USE AS AN ELASTOMERIC BARRIER IN WATER STORAGE AND TREATMENT SYSTEMS AND THE LIKE

SUMMARY OF THE INVENTION

The present invention relates to a universal elastomeric compound which due to its ability to reduce gas diffusion through the compound and its excellent chlorine compatibility (where "chlorine compatible" is defined herein to include compatibility with chlorine per se and compositions of matter including chlorine and related halogen family chemical compositions) allows for its effective use as a diaphragm, barrier or the like in potable water storage and treatment containers, vials, pumps, valves or the like.

The two main ingredients of the present composition are: 1) EPDM, a terpolymer of ethylene-propylene-nonconjugated diene copolymer such as ROYALENE 3180, and 2) a butyl, or more particularly, a chlorinated isobutylene such as Chlorobutyl 1066. This EPDM/butyl combination is further cured with tetramethylthiuram disulfide, zinc thiophosphate, and a treated sulfur so that the membrane created from the herein disclosed compound does not affect the taste or odor of the fluid (e.g. water) that it comes in contact with when used as a container barrier. Adding an organofunctional magnesium silicate to the EPDM/butyl compound also provides resistance to any chloramines in the water.

In view of the improved characteristics that the present universal elastomeric compound exhibits when coming in contact with fluids, most particularly water, in addition to yielding extractants below the specified requirements of ANSI/NSF Standard 61 Health Effects Standard, the compound can be most effective when used as an elastomeric barrier formed as a diaphragm structure for use as a diaphragm divider in water storage and treatment systems, valve, pump or the like.

FIELD OF THE INVENTION & DESCRIPTION OF THE PRIOR ART

EPDM, a terpolymer of ethylene-propylene-nonconjugated diene copolymer, is widely employed in the tire manufacturing industry.

In addition, EPDM membranes, particularly single-ply membranes, are often used as roofing materials. When employed for this use, it is usually necessary to bond an EPDM membrane to itself in order to create a lap seam. Various adhesives have been developed for bonding said EPDM membranes.

It is also known that graft copolymers obtained by grafting styrene, acrylonitrile and the like on a rubber EPDM component having substantially no unsaturated bond in the main chain, namely AES resins, have greater resistance to ultraviolet rays, oxygen and ozone; and much better weather resistance than ABS resins obtained by grafting these monomers on a diene based rubber. See U.S. Pat. Nos. 4,851,462, 4,603,164 and 4,501,842.

Various butyl/EPDM formulations have been molded into several forms of elastomeric sealing barriers such as stoppers, diaphragms, and pistons for pharmaceutical containers including vials, cartridges, syringes or the like. EPDM rubber barriers are preferred in these applications due to their good elasticity, moldability, inertness and consequent non-reactivity when placed in prolonged contact with fluid, or more particularly pharmaceutical liquids. See U.S. Pat. Nos. 5,279,606, 5,114,411, and 4,973,504.

Other relevant U.S. Patents illustrative of the state of the art as of July 1996, are shown in the following issued U.S. Pat. Nos. 4,960,829, 4,814,388, 4,599,384, 4,026,966, 3,968,185, and 3,806,555.

The 1990 patent to Allen, which is now owned by Uniroyal Chemical Company, (U.S. Pat. No. 4,960,829), discloses an elastomeric composition comprising the following components (1) an elastomer, such as butyl rubber, chlorinate polyethylene and chlorosulfonated polyethylene; (2) about 5–50% of a terpolymer comprising (a) ethylene, (b) alphaolefin, such as propylene, and (c) a nonconjugated polyene, such as ethylidene norbornene; and (3) 0.5–5 parts by weight per 100 parts of polymer of curative components, such as tetramethylthluram disulfide and or sulfur. Component 2 (a terpolymer comprising (a) ethylene, (b) alphaolefin, such as propylene, and (c) a nonconjugated polyene, such as ethylidene norbornene) is added in a sufficient amount so that the viscosity of the blend is at least 5% lower than the viscosity of component 1 (an elastomer, such a butyl rubber, chlorinate polyethylene and chlorosulfonated polyethylene).

Also included in the recipe for this disclosed elastomeric composition are various additives or curatives such as a metal salt or oxide, reinforcing agents, fillers, processing aids, extender oils, plasticizers, antioxidants, UV stabilizers, and crosslinking agents. Examples of these additives include carbon black, zinc oxide and SUNPAR 2280 (see Table 1).

The above referenced U.S. Pat. No. 4,960,829 does not disclose the improved range of ingredients disclosed in the present application.

Nagai, in U.S. Pat. No. 4,814,388, assigned to Japan Synthetic Rubber, Co. Inc., discloses a rubber modified thermoplastic resin composition that is obtained by copolymerizing an aromatic vinyl compound, such as styrene or a derivative thereof, and optionally, monomers, especially acrylonitrile, in the presence of an ethylene olefin type rubber polymer such as ethylenepropylene-ethylidene norbornene (E-P-ENB) terpolymers. These polymers may be blended with other polymers, such as chlorinated polyethylene.

The above referenced U.S. Pat. No. 4,814,388 does not disclose or claim any percentages for the blended polymer.

The patent issued to Farona, and assigned to the University of Akron (U.S. Pat. No. 4,599,384) discloses a novel EPDM-isobutylene graft copolymer comprising ethylene-propylene-polyisobutenyl (PIB) and ethylidene norbornene (ENB) terpolymer. The terpolymer is made by reacting ethylene, propylene and PIB-ENB (ie. ethylene-propylene-polyisobutenyl polyisobutenyl and ethylidene norbornene). PIB-ENB is made by reacting a chlorinated ENB with PIB (see examples in the U.S. Pat. No. 4,599,384). Useful additives include colorants, dyes, antioxidants, stabilizers and curing agents, such as sulfur, zinc oxide (see column 4, lines 13–22). The percentages of the components in the U.S. Pat. No. 4,599,384 are not claimed except as they are shown in the examples and thus do not anticipate or make obvious the presently disclosed ranges of compounds for use as a diaphragm divider in water storage and treatment systems or the like.

Wako Pure Chemical Industries, Ltd. is the assignee of U.S. Pat. No. 3,806,555. This patent simply discloses a process for crosslinking olefin polymers, such as any polymer or copolymer containing as monomers or comonomers, terminally unsaturated groups, such as chlorinated polyolefins such as chlorinated polyethylene and/or ethylene-propylene-ethylidene norbornene (ie., E-P-ENB—see column 2, lines 56-column 3, line 6).

These crosslinked polymers contain additives such as antioxidants, fillers, pigments, plasticizers and stabilizers (see, column 3, lines 55–67). This includes what is shown in the examples, ie. stearic acid, zinc white, carbon black HAF. Again, this patent (the U.S. Pat. No. 3,806,555) like the earlier cited prior art does not give percentages, particularly, for situations where these two copolymers are co-monomers in a copolymer.

The 1977 patent owned by Exxon Research & Engineering (U.S. Pat. No. 4,026,966 to Baldwin) and the thirty year old expired, and unassigned, Baldwin patent (U.S. Pat. No. 3,968,185) both generally disclose a method for the preparation of modified elastomers comprising graft curing an ethylene-propylene-ethylidene norbornene polymers in the presence of additives, such as Mistron Vapor, zinc oxide and stearic acid (See the text below Table V in column 13–14 of the Baldwin references). The relevance of these patents are only to the effects of the additives on the overall combination.

Although considered new and useful as modified elastomeric compositions or as novel EPDM/isobutylene graft co-polymers for use in the tire, roofing and adhesive industries, none of the prior art patents cited hereinabove discloses a range of EPDM/butyl compounds that find particularly effective use as diaphragm dividers in containers for water storage and treatment systems or the like.

In relation to the objects of the present invention, it is generally known from the prior art that EPDM has excellent chlorine compatibility, however, it has poor permeability and imparts a change in the odor and taste to the fluids it comes in contact with. Butyl, although having excellent permeability (ie. the ability to retard the passage of gas through the compound), has poor chlorine compatibility.

Prior art patents have tried to combine the two (2) compounds of EPDM and butyl with the result being that the combined EPDM/Butyl) compound has a better permeability than EPDM alone, and three times greater than that of butyl. Although each of the specific EPDM/Butyl compounds disclosed in the prior art exhibit their own unique characteristics for their particular use, each has its own limitation which is overcome by the herein disclosed universal EPDM/butyl compound. Accordingly, none of the disclosures in the above referenced patents, taken alone or in combination, anticipate or render obvious the present invention.

In addition, the supplemental curative ingredients used together with the EPDM/butyl compound disclosed herein, yield extractants beyond the specified requirements of ANSI/NSF Standard 61 Health Effects Standard. This makes the presently disclosed universal EPDM/butyl compound particularly useful as a diaphragm divider in containers for water storage and treatment systems or the like.

Accordingly, a principal object of the present invention is (in conjunction with the other objects of the invention set forth hereinafter) to provide a new, improved EPDM/butyl composition which, according to one embodiment of the invention, is ROYALENE 3180/Chlorobutyl 1066, which combination is further cured with tetramethylthiuram disulfide, zinc thiophosphate, a treated sulfur and an organofunctional magnesium silicate so that the membrane created from the herein disclosed compound does not effect the taste or odor of the water that it comes in contact with when used as a container barrier and additionally provides resistance to any chloramines in the water.

In view of the improved characteristics that the present universal elastomeric compound exhibits when coming in contact with water, in addition to yielding extractants beyond the specified requirements of ANSI/NSF Standard 61 Health Effects Standard, the compound can be most effective when used as an elastomeric barrier formed as a diaphragm structure for use as a diaphragm divider in water storage and treatment systems or the like (see for example the expansion and storage tank disclosed in U.S. patent application Ser. No. 08/602,249, filed Feb. 15, 1996.

OBJECTS OF THE INVENTION

It is accordingly a primary object of the present invention to provide an EPDM/Butyl compound that makes up an elastomer which provides improved, unique physical qualities.

Another object of the present invention is to provide an EPDM/Butyl compound that can be mixed and molded (for example, using well known injection molding techniques) into a diaphragm or barrier for use in water storage and treatment containers, using known methods.

Still another object of the present invention is to provide an EPDM/Butyl compound whose improved molecular structure greatly reduces the prospect of gas diffusing though the compound.

A still a further object of the present invention is to provide an EPDM/Butyl compound whose physical qualities will not degrade when exposed to a liquid chlorine environment, and in which a specific amount of EPDM is contained therein so that EPDM/butyl compound formed into a diaphragm does not impart any objectionable odor or taste to water that it comes in contact with.

Still another object of the present invention is to provide an EPDM/Butyl compound that when formed into a diaphragm (for example via injection molding) and used in a water storage or treatment container, will, when coming in contact with the potable water therein, meet the extractants requirements of the ANSI/NSF Standard 61 Health Effects Standard.

A still a further object of the present invention is to provide an EPDM/Butyl compound that when formed into a diaphragm (for example via injection molding) and used in a water storage or treatment container, will have a good flex capacity (defined herein to mean the ability to flex through its entire motion at least 250,000 cycles).

Another object of the invention is to provide an effective EPDM/Butyl compound that satisfies all of the above other objects and which can be cost effectively manufactured by industry.

Other objects, advantages and novel features of this invention will become readily apparent to those skilled in the art from the following detailed description of the invention.

DETAILED DESCRIPTION OF THE INVENTION

The aforementioned objects of the invention are achieved by an elastomeric EPDM/butyl composition which is non-reactive, exhibits low gas permeablity (e.g., a permeability approximating that of butyl alone), has good chlorine compatibility and flex capacity. These qualities are achieved by the elastomeric composition disclosed herein only because of the specific ratio of EPDM to the halogenated isobutylene claimed. The term "good permeability" as used herein is defined herein to mean the low gas permeability characteristic described hereinabove.

In addition, the ingredients claimed in the overall mixture of the EPDM/butyl composition. will, when coming in contact with potable water, meet the extractant requirements of ANSI/NSF Standard 61 Health Effects Standard.

Due to these improved qualities, the claimed composition can be mixed and molded, by known means such as injection molding, into a membrane or diaphragm which may be used to separate a tank or container holding, for example potable water which is kept in one section of the tank, and gas or liquid, which is in the other section of the tank.

The improved chemical properties of the EPDM/Butyl composition described herein, when formed into a separating membrane or diaphragm, will retard gas from diffusing from one section of the separated tank to the other. In addition, the improved EPDM/Butyl compound formed diaphragm will not degrade when exposed to a liquid chlorine environment.

A specific amount of EPDM is contained in formed diaphragm so that it does not impart any objectionable odor and taste to water that it may come in contact with.

EPDM's are copolymers of ethylene, propylene and a nonconjugated diene. These rubbery polymers generally have a Mw/Mn ratio of 1.2 to 4.5 and most preferably 1.8 to 4. Ethylene-propylene-diene monomer (EPDM) terpolymers can be synthesized using dicyclopentadiene, ethyldenenorborene and 1,4-hexadiene.

In general, an EPDM terpolymer is made up of ethylene and propylene units randomly distributed in the backbone thereof, the total number of said ethylene and propylene units being from about 100 to about 10,000, with the amount of ethylene units ranging from about 10 percent to about 90 percent based on the total number of ethylene and propylene units. from about 1 to 100

P groups where R is a terpolymerizable head group selected from the group of dicyclopentadiene and ethyldenenorborene, said R is attached to polymer P selected from the group consisting of polyisobutelene and polystyrene, wherein the graft copolymer has a molecular weight of from about 5,000 to 1,000,000.

An EPDM graft copolymer can generally be tailor made with regard to any specific molecular weight and number of graft branches dependent therefrom. The EPDM graft copolymer of the present invention is useful for compatibilization with halogenated isobutylene (e.g. chlorinated isobutylene), in a particular ratio, to find utility as a separating membrane in a potable water storing tank or container. In the present invention, the preferable EPDM used in the combined mixture is a terpolymer of ethylene-propylene-non-conjugated diene copolymer that is sold under the tradename ROYALENE 3180.

The EPDM tradename ROYALENE 3180, owned by Uniroyal Chemical Company, Inc., has the following properties and specifications:

| Raw Polymer Properties | Test Method | Min. | Max. | Typical |
|---|---|---|---|---|
| Mooney Visc, ML 1 + 4 @ 125C | R-1 | 51 | 61 | — |
| E/P Weight Ration | R-2 | — | — | 66/34 |
| ENB, Weight % | R-6 | — | — | 2 |
| Molecular Wt. Distribution | R-9 | — | — | Broad |
| Volatile Matter, Weight % | R-3 | — | 1.0 | — |
| Ash, Weight | R-4 | — | 0.15 | |
| Stabilizer | | — | — | Non-Staining |
| Specific Gravity | ASTM D-792 | — | — | 0.86 |
| Color | R-7 | — | — | Off-white |
| Physical Form, lbs/bale | — | — | — | 75(34 Kg) |
| Packaging | — | — | — | 3150(1429 Kg) |

ROYALENE 3180 EPDM has excellent heat resistance, low calendar shrinkage, excellent tear and green strength. it also co-cures well with butyl rubber, another Ingredient of the present claimed composition, for resultant improved heat and ozone resistance.

The molecular structure of regular butyl rubber is schematically illustrated, as represented by Skeist, I., Handbook of adhesives, pp. 225. New York, Reinhold Publishing Corp. (1977), as follows;

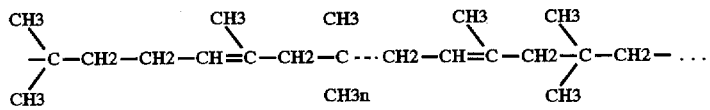

were n Is about 50.

Halogenation of the butyl rubber polymer illustrated above can be performed in any known manner, however is preferably derived through a proprietary process with up to 90% of the halogenation situated allylic to the double bond with retention of most of the unsaturation. In the present invention, the preferable halogenated butyl rubber used in the combined mixture is chlorinated isobutylene, or more particularly, the tradename chlorinated isobutylene Chlorobutyl 1066.

In one preferred embodiment of the present invention, the weight ratio (out of 270.5 parts) of the EPDM (e.g. ROYALENE 3180) to butyl or a halobutyl, such as chlorobutyl and bromylbutyl, (e.g. Chlorobutyl 1066) is 40 parts EPDM to 60 parts butyl. This ratio can vary, in other preferred embodiments, by 5 parts, i.e. the range of 35 parts EPDM to 65 parts butyl (per 270.5 parts) to the range of 45 parts EPDM to 55 parts butyl. Other reagents are added to this EPDM/butyl mix to result in a composition that has improved qualities. This particular ratio of EPDM to butyl results in an improved composition which can be used in manufacturing a membrane or diaphragm which, when coming into contact with water, is non-reactive, exhibits low gas permeability, has good chlorine compatibility, flex capacity, and imparts low odor/taste.

The addition of a curative system of zinc thiophosphate (e.g., tradename ROYALAC 136), tetramethylthiuram disulfide (e.g., tradename TUEX) and treated sulfur (e.g., tradename Spider Sulfur) to the EPDM/butyl mix imparts low taste and odor to the water it contacts. Also, the addition of platy fillers, i.e. organofunctional magnesium silicate vapors (e.g., tradename Mistron CB), provides low gas permeability. Also the particular blend ratio of ROYALENE 3180 (EPDM) to Chlorobutyl 1066 (butyl) with the Mistron CB vapor (organofunctional magnesium silicate) provides excellent resistance to chloramines. This is particularly important in using the compound disclosed herein in manufacturing membranes for use in containers holding water because it is well known that chlorobutyl alone has a very poor resistance to chloramines found in water.

EXAMPLE OF PREFERRED EMBODIMENT 1 OF THE ELASTOMERIC COMPOUND OF THIS INVENTION

| Composition | Parts Per 270.50 |
| --- | --- |
| ROYALENE 3180 (terpolymer of ethylene-propylene-non-conjugated diene copolymer) | 40 |
| Chlorobutyl 1066 (halogenated isobutylene) | 60 |
| N-550 Black (furnace or carbon black) | 75 |
| SUNPAR 150 Oil (paraffinic oil) | 35 |
| Mistron CB (organofunctional magnesium silicate) | 50 |
| Maglite D Bar (magnesium oxide) | 1 |
| Zinc Oxide | 5 |
| Stearic Acid | 1 |
| TUEX (tetramethylthiuram disulfide) | 1.25 |
| ROYALAC 136 (zinc thiophosphate) | 0.75 |
| Spider Sulfur (treated sulfer) | 1.5 |

This particular ratio of EPDM to butyl results in an improved composition which can be used in manufacturing a membrane or diaphragm which, when coming into contact with water, is non-reactive, exhibits low gas permeability, has good chlorine compatibility and flex capacity.

The first preferred embodiment of the elastomeric composition having the ratio listed above has the following measured physical properties:

| | hz,1/32 | |
| --- | --- | --- |
| MOONEY Viscosity | | 52 |
| (ML 1 + 4 at 212F) | | |
| MOONEY Scorch | | 10.17 |
| (MS at 270F) | | |
| RHEOMETER at 340F, 50 RANGE: | | |
| Torque | ML | 3.57 |
| | MH | 21.79 |
| Time | Ts1 | 1.77 |
| | Tc90 | 8.67 |
| UNAGED PHYSICAL PROPERTIES | | |
| Cured 15' at 340F. | | |
| 100% Modulus, psi | | 370 |
| 300% Modulus, psi | | 1050 |
| Tensile Strength | | 1560 |
| % Elongation | | 480 |
| Hardness, Duro A | | 70 |

Not only is this above listed particular EPDM/butyl composition non-reactive, exhibits low gas permeability, and chlorine compatible but any membrane formed therefrom (e.g., injection-molded therefrom), has an above average flex capacity. In addition the composition does not impart any objectionable odor and taste to stored water that it comes in contact with and does not have extractants that exceed ANSI/NSF Standard 61.

EXAMPLE OF PREFERRED EMBODIMENT 2 OF THE ELASTOMERIC COMPOUND OF THIS INVENTION

| Composition | Parts Per 270.5 |
| --- | --- |
| ROYALENE 3180 (terpolymer of ethylene-propylene-non-conjugated diene copolymer) | 35 |
| Chlorobutyl 1066 (halogenated isobutylene) | 65 |
| N-550 Black (furnace or carbon black) | 75 |
| SUNPAR 150 Oil (paraffinic oil) | 35 |
| Mistron CB (organofunctional magnesium silicate) | 50 |
| Maglite D Bar (magnesium oxide) | 1 |
| Zinc Oxide | 5 |
| Stearic Acid | 1 |
| TUEX (tetramethylthiuram disulfide) | 1.25 |
| ROYALAC 136 (zinc thiophosphate) | 0.75 |
| Spider Sulfur (treated sulfur) | 1.5 |

Another example of the ratio of components of the EPDM/butyl composition that satisfy the objectives of this invention are as follows:

EXAMPLE OF PREFERRED EMBODIMENT 3 OF THE ELASTOMERIC COMPOUND OF THIS INVENTION

| Composition | Parts Per 270.5 |
| --- | --- |
| ROYALENE 3180 (terpolymer of ethylene-propylene non-conjugated diene copolymer) | 45 |
| Chlorobutyl 1066 (halogenated isobutylene) | 55 |
| N-550 Black (furnace or carbon black) | 75 |
| SUNPAR 150 Oil (paraffinic oil) | 35 |
| Mistron CB (organofunctional magnesium silicate) | 50 |
| Maglite D Bar (magnesium oxide) | 1 |
| Zinc Oxide | 5 |
| Stearic Acid | 1 |
| TUEX (tetramethylthiuram disulfide) | 1.25 |
| ROYALAC 136 (zinc thiophosphate) | 0.75 |
| Spider Sulfur (treated sulfur) | 1.5 |

It has been determined in tests that a range in the ratio of from 35–45 parts per 270.5 of ROYALENE 3180 (terpolymer of ethylene-propylene-non-conjugated diene copolymer) to 65–55 parts of Chlorobutyl 1066 (halogenated 5 isobutylene) when combined with 50 parts Mistron CB (organofunctional magnesium silicate), 0.75 parts zinc thiophosphate (e.g. tradename ROYALAC 136), 1.25 parts tetramethylthiuram disulfide (e.g. tradename TUEX) and 1.5 parts treated sulfur (e.g. tradename Spider Sulfur) will satisfy all of the herein claimed objectives.

Further testing has also determined that using any ratio of EPDM/Butyl beyond the range disclosed and claimed herein (35–45 parts per 270.5 of ROYALENE 3180 to 65–55 parts of Chlorobutyl 1066) will not result in a compound that can meet all of the objectives of this invention.

Since the invention is described and illustrated with reference to but a few preferred embodiments, and since numerous modifications and changes may become readily apparent to those skilled in the art after reading this disclosure, it should be understood that the invention is not limited in scope to the compositions shown and described hereinabove; but rather reference should be made to the claims which are intended to cover all such modifications and variations which fall within the true scope and spirit of the invention.

What is claimed is:

1. An elastomeric composition that exhibits low gas permeability and is chlorine compatible, comprising a mixture having a combination of the following compounds:
   a terpolymer of ethylene-propylene-non-conjugated diene copolymer (EPDM); halogenated isobutylene; furnace or carbon black; paraffinic oil; organofunctional magnesium silicate; magnesium oxide; zinc oxide; stearic acid; tetramethylthiuram disulfide; zinc thiophosphate; and treated sulfur.

2. The elastomeric composition of claim 1 wherein the amount of each of the compounds of the mixture has the following range of parts/per 270.5:
   40/270.5 of EPDM;
   60/270.5 of halogenated isobutylene;
   75/270.5 of furnace or carbon black;
   35/270.5 of paraffinic oil;
   50/270.5 of organofunctional magnesium silicate;
   1/270.5 of magnesium oxide;
   5/270.5 of zinc oxide;
   1/270.5 of stearic acid;
   1.25/270.5 of tetramethylthiuram disulfide: 0.75/270.5 of zinc thiophosphate; and
   1.5/270.5 of treated sulfur.

3. The elastomeric composition of claim 2 wherein the 40 parts of EPDM and the 60 parts of halogenated isobutylene, can each vary in a range of +/−5 parts/per 270.25 of the overall mixture.

4. The elastomeric composition of claim 3 wherein the 60 parts per 270.25 (+/−5 parts per 270.25) of halogenated isobutylene is chlorinated isobutylene.

5. The elastomeric composition of claim 2 wherein the mixed composition is moldable.

6. The elastomeric composition of claim 2 wherein the 40 parts per 270.25 (+/−5 parts per 270.25) of EPDM is ROYALENE 3180.

7. The elastomeric composition of claim 4 wherein the 60 parts per 270.5 (+/−5 parts per 270.5) of chlorinated isobutylene is Chlorobutyl 1066.

8. The elastomeric composition of claim 2 wherein the 60 parts per 270.5 (+/−5 parts per 270.5) of halogenated isobutylene is a halobutyl selected from the group consisting of chlorobutyl and bromylbutyl.

9. The elastomeric composition of claim 2 wherein the 75 parts per 270.5 of furnace or carbon black is N-550 BLACK.

10. The elastomeric composition of claim 2 wherein the 35 parts per 270.5 of paraffinic oil is SUNPAR 150 Oil.

11. The elastomeric composition of claim 2 wherein the 50 parts per 270.5 of organofunctional magnesium silicate is MISTRON CB.

12. The elastomeric composition of claim 2 wherein the 1 part per 270.5 of magnesium oxide is MAGLITE D BAR.

13. The elastomeric composition of claim 2 wherein the 1.25 parts per 270.5 of tetramethylthiuram disulfide is TUEX.

14. The elastomeric composition of claim 2 wherein the 0.75 parts per 270.5 of zinc thiophosphate is ROYALAC 136.

15. The elastomeric composition of claim 2 wherein the 1.5 parts per 270.5 of treated sulfur is Spider Sulfur.

16. The elastomeric composition of claim 1 wherein the composition meets the extractant requirements of ANSI/NSF Standard 61 Health Effects Standard.

17. An elastomeric composition as set forth in claim 1 which does not effect the odor and/or taste of liquids that come in contact with it.

18. An elastomeric composition as set forth in claim 1 which exhibits flex capacity.

19. An elastomeric composition that can be mixed and then be molded, by known means, to form a membrane, whereby said composition retards gas from diffusing through said formed membrane, and whereby said membrane is chlorine compatible, comprising a mixture of each of the following amounts of compounds:
   40/270.5 of ROYALENE 3180;
   60/270.5 of Chlorobutyl 1066;
   75/270.5 of N-550 BLACK;
   35/270.5 of Sunpar 160 Oil;
   50/270.5 of MISTRON CB;
   1/270.5 of MAGLITE D Bar;
   5/270.5 of zinc oxide;
   1/270.5 of stearic acid;
   1.25/270.5 of TUEX;
   0.75/270.5 of ROYALAC 136; and
   1.5/270.5 of Spider Sulfur.

20. The elastomeric composition of claim 19 wherein the 40 parts of ROYALENE 3180 and the 60 parts of Chlorobutyl 1066, can each vary in a range of +/−5 parts/per 270.25 of the overall mixture.

21. The elastomeric composition of claim 19 wherein the membrane formed therefrom has a Mooney Viscosity of about 52 (ML 1+4 at 212 F.).

22. The elastomeric composition of claim 19 wherein the membrane formed therefrom has a Mooney Scorch of 10.17 (MS at 270 F.).

23. The elastomeric composition of claim 19 wherein the membrane formed therefrom will, when coming in contact with water, meets the extractant requirements of ANSI/NSF Standard 61 Health Effects Standard.

24. A container for storing potable water comprising:
   (a) a tank; and
   (b) a means for separating the tank into a first interior portion and a second separate interior portion; wherein said means for separating the tank into said two portions spans the interior of said tank; and wherein said means for separating the tank is a membrane, wherein the membrane that separates the tank along its span into two portions is comprised of a composition whereby said composition retards gas from diffusing though said formed membrane, and whereby said membrane is chlorine compatible.

25. The container of claim 24 wherein the membrane that separates the tank along its span into two portions will, when coming in contact with potable water, meet the extractant requirements of ANSI/NSF Standard 61 Health Effects Standard.

26. The container of claim 24 wherein said membrane is molded, by known means, from a composition comprising a mixture of each of the following amounts of compounds:
   40/270.5 of ROYALENE 3180;

60/270.5 of Chlorobutyl 1066:
75/270.5 of N-550 BLACK;
35/270.5 of Sunpar 150 011;
50/270.5 of MISTRON CB;
1/270.5 of MAGLITE D Bar;
5/270.5 of zinc oxide;
1/270.5 of stearic acid;
1.25/270.5 of TUEX;
0.75/270.5 of ROYALAC 1,16; and
1.5/270.5 of Spider Sulfur.

27. The elastomeric composition of claim 25 wherein the amount of ROYALENE 3180 and Chlorobutyl 1066 can vary in a range of 5 parts/per 270.5 in the overall mixture.

* * * * *